J. TREKOFSKI.
COMBINED HAY LIFTER AND STACKER.
APPLICATION FILED FEB. 5, 1908.
926,222.
Patented June 29, 1909.
2 SHEETS—SHEET 1.
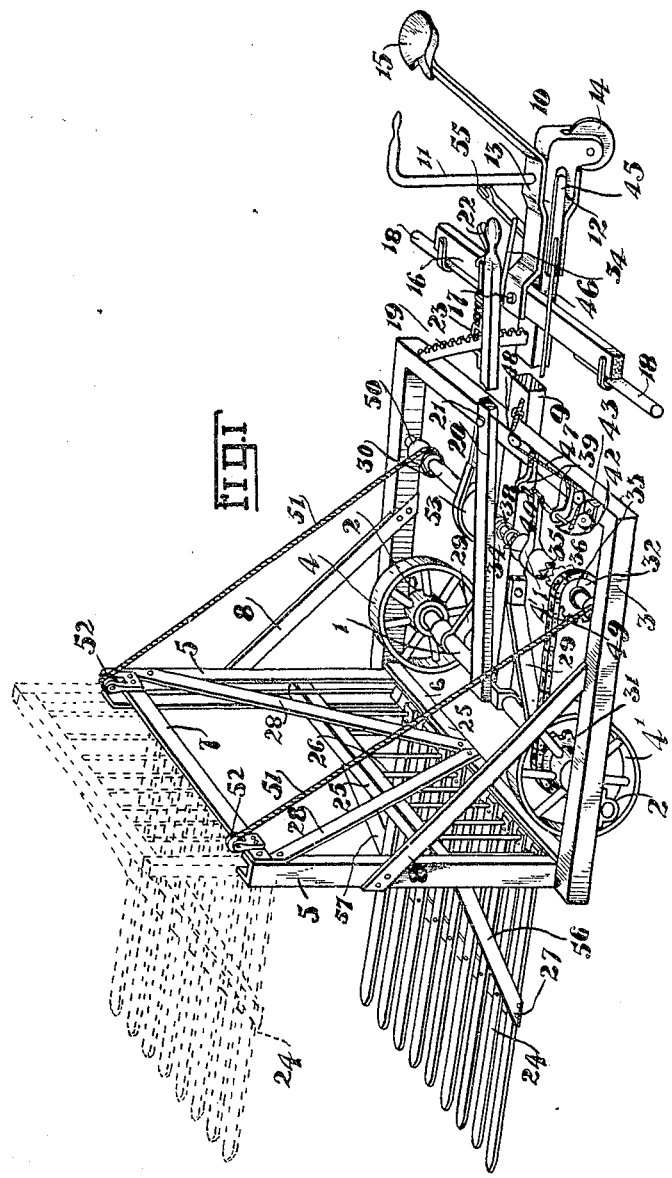
WITNESSES
INVENTOR
John Trekofski

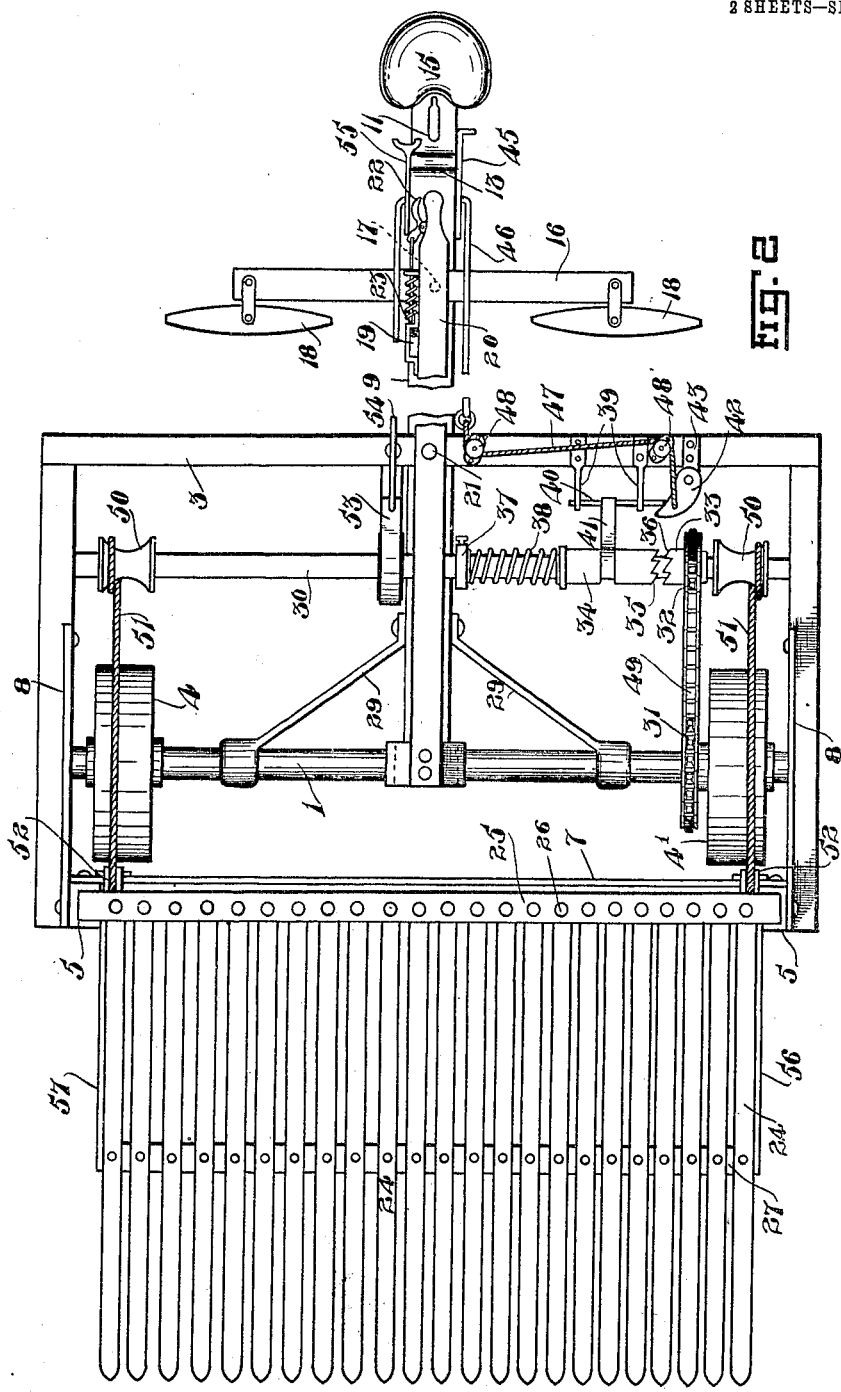

UNITED STATES PATENT OFFICE.

JOHN TREKOFSKI, OF IRVINE, ALBERTA, CANADA.

COMBINED HAY LIFTER AND STACKER.

No. 926,222.      Specification of Letters Patent.      Patented June 29, 1909.

Application filed February 5, 1908. Serial No. 414,370.

*To all whom it may concern:*

Be it known that I, JOHN TREKOFSKI, of the village of Irvine, in the Province of Alberta, Canada, have invented certain new and useful Improvements in Combined Hay Lifters and Stackers, of which the following is the specification.

My invention relates to an agricultural implement of the class above, and the object of the invention is to provide a machine which will rake and lift hay or such like material from the fields and further elevate and unload it on a stack, the whole being under the control of a single operator seated to the rear.

The invention is shown in the accompanying drawings, in which—

Figure 1 is a perspective view of my complete invention with the fingers shown dotted in the upper position. Fig. 2 is an enlarged plan view of the machine.

In the drawings like characters of reference indicate corresponding parts in each figure.

1 is the main shaft carried at its ends in bearings 2, secured one at either side and forwardly of the center of the rectangular framework 3.

4 4' are the supporting or carriage wheels, rotatable on the shaft. In this wise the framework is free to be tilted on the shaft.

5 are a set of opposing channel bar uprights, at the forward end of the framework 3, fastened at the bottom to the cross beam 6, and interconnected at the top by a cross strip 7.

8 are braces passing angularly between the vertical guides and the framework.

9 is the tongue of the machine which passes rearwardly from the shaft to which it is secured.

10 is a heavy casting pivotally connected by a steering rod 11, carrying a handle, to plates 12 13, secured to the rear end of the tongue, the said casting having bearings formed therein for the swivel or caster wheel 14. The casting is made heavy to counterbalance the weight of the fingers and the load carried thereby, as hereinafter explained. The upper plate 13 extends rearwardly and upwardly, and is fitted with a suitable seat 15 within convenient range of the steering handle.

16 is a doubletree, fastened to the tongue by the king bolt 17, passing through the forward end of the plate 13, and 18 are the whiffle trees which are connected to the doubletree by the ordinary clevis and bolt.

In the drawings I have broken the tongue in order that I might show the complete machine on a single sheet, but it will be understood that the length of the tongue behind the framework is sufficient to allow of a team, to be hitched to the whiffle trees.

19 is a portion of a quadrant fastened on the tongue, and 20 is a lever connected forwardly to the main shaft by any suitable means which will allow it to turn on the shaft.

21 is a bolt connecting the lever with the rear cross beam of the framework, and 22 23 are the ordinary hand latch and detent, supplied at the rear end of the lever. The detent operates on the quadrant and the hand latch is within convenient range of the seat. By means of the lever the operator is enabled to turn the framework on the axle, the advantage of which will be shortly disclosed.

24 are forwardly extending fingers, secured rigidly to a framework, consisting of upper and lower cross members 25, interconnected by rods 26, the fingers being fastened to the lower cross members. The latter framework is slidable vertically in the guides 5, and consequently the fingers may be raised to any desired height by simply lifting the frame.

27 is a cross bar spacing the fingers apart and reinforcing them.

28 are braces passing from the upper ends of the guides, downwardly to the forward cross beam of the framework 3.

29 are side braces passing between the tongue and the main shaft.

30 is a counter shaft running parallel with the main shaft, and carried at its ends in bearings formed in the framework 3.

31 is a sprocket wheel connected to the carriage wheel 4', and rotatable therewith, and 32 is a sprocket wheel carried on a sleeve 33, which is free to rotate on the shaft 30.

34 is a second sleeve feathered on the shaft 30, and has at its one end teeth 35, adapted to engage with teeth 36 on the adjoining end of the sleeve 33.

37 is an adjustable collar on the shaft, and 38 is a spiral spring between the collar and the sleeve 34, the spring being supplied to continuously tend to throw the teeth into engagement. The collar is supplied simply to adjust the strength of the spring.

39 are brackets extending from the rear cross beam of the framework 3, and carrying a slidable rod 40 to which is connected a bifurcated arm 41 engaging with the sleeve 34. 42 is a cam, pivotally supported by the arm 43, carried by the latter beam.

45 is a foot lever pivoted to the tongue within convenient range of the seat. The lever is connected to the cam by means of a rod 46 and rope or cable 47, the rope passing through a set of pulleys 48. The position of the cam is such that it engages with the rod 40. When the operator presses the lever 45 into the position as shown in the drawings, he disengages the teeth, and by throwing the lever upwardly the teeth are engaged and the shaft 30 caused to rotate by means of the sprocket chain 49 inter-connecting the sprocket wheels.

50 are spools or drums keyed on the shaft 30, and 51 are ropes or cables passing from the respective spools upwardly through pulleys 52 to the lower beam 25, from which extend the fingers.

53 is a friction brake, of the ordinary form, on the shaft 30, consisting in a friction wheel and strap, the strap being fastened at one end to the rear beam of the frame and at the other to a rod 54 connected to a foot lever 55 pivoted to the tongue.

56 and 57 are braces passing from the uprights 5 forwardly and downwardly to the side of the fingers 24.

In order to more fully understand my invention I will now describe it when in actual use. The team being attached to the whiffle trees, the operator takes his place on the seat 15, and throws the forward tips of the fingers downwardly by raising the lever 20. The fingers gather the hay or such like material from the field, and when sufficiently filled the latter lever is thrown down to the original position, as shown in Fig. 1. The next operation is to drive to the stack, and it will be seen by the peculiar position of the tongue that it is possible for the fingers to be placed next the stack. To unload the hay collected the lever 45 is thrown to the position which will engage the teeth, and the shaft 30 is rotated due to the inter-connections between it and the main shaft, and the teeth are raised vertically by the ropes 51 winding on the spools. The height to which the fingers are raised (otherwise the load) is to clear the top of the stack. When in this position they might be, if desired, tilted slightly forward, and this motion combined with the backward motion of the machine, caused by the operator backing the team, slides the hay onto the stack. The friction brake 53 controls the dropping of the fingers to the lower position, when the teeth are disengaged as will readily be understood by reference to the drawings. In taking second loads the operation is simply repeated. The weight of the casting 10 should be sufficient to counter-balance the weight of the greatest load which may be lifted by the fingers.

What I claim as my invention is:

In a device of the class described the combination with a rectangular framework having a vertical set of opposing channel bar uprights, of a main shaft passing across the framework and carrying a set of carriage wheels, a tongue extending rearwardly from the main shaft beneath the framework, a swivel wheel secured to the rear end of the tongue, means for allowing for the attachment of draft animals to the tongue, a seat to the rear of the tongue, a portion of a quadrant on the tongue, a lever extending rearwardly from the main shaft and controlled by a hand latch and detent operating on the quadrant, the said lever being fastened to the rear cross member of the framework, a set of fingers extending forwardly from the framework slidable in the aforesaid vertical uprights, a counter shaft to the rear of the main shaft, drums on the counter shaft, cables connecting the drums over pulleys to the latter framework, a gear wheel on the main shaft and a gear wheel sleeved on the counter shaft, and rotatable thereon, the said gear wheels being inter-connected by a gear chain, a second sleeve feathered on the counter shaft and carrying teeth to engage with teeth on the former sleeve, a spring designed to hold the teeth continuously in engagement, means controlled by a foot lever carried on the tongue for passing the teeth out of engagement, and a friction brake on the counter shaft controlled by a foot lever on the tongue whereby the rotation of the counter shaft may be controlled when the teeth are out of engagement, as and for the purpose specified.

Signed at Irvine, in the Province of Alberta, this 18th day of November 1907.

JOHN TREKOFSKI.

Witnesses:
LESLIE V. B. MAIS,
SAM KALMBOCH.